United States Patent Office 3,793,305
Patented Feb. 19, 1974

3,793,305
ONE-STEP PROCESS OF PREPARING AZO DYES BY SIMULTANEOUS DIAZOTIZATION AND COUPLING AT LOW pH
Walter J. Balon, Woodstown, N.J., assignor to E. I. du Pont de Nemours and Company, Wilmington, Del.
No Drawing. Filed Sept. 14, 1970, Ser. No. 72,101
Int. Cl. C09b 29/00, 33/00, 41/00
U.S. Cl. 260—154
12 Claims

ABSTRACT OF THE DISCLOSURE

A one-step process for preparing azo dyes in a reaction mixture comprising an aromatic amine, coupler, diazotizing agent and an acidic liquid medium capable of dissolving at least a portion of the amine and the coupler and capable of producing a pH of 4 or less when the mixture is diluted with 25% its volume of water, maintaining the concentration of the diazotizing agent and the temperature and acidity of the mixture so that the rate of consumption of diazotizing agent is substantially the same as the rate of formation of azo dye.

BACKGROUND OF THE INVENTION (1) Field of the invention

This invention relates to a one-step process for preparing azo dyes.

(2) Description of the prior art

Azo dyes have traditionally been prepared on a commerical scale by a multi-step procedure. That procedure involves preparing an appropriate aqueous solution or dispersion of a diazonium salt of a primary aromatic amino compound in one reaction vessel, preparing an appropriate aqueous solution or dispersion of a coupling compound in a second vessel, and either adding one of these masses to the other or mixing them in a third vessel, sometimes with the concurrent addition of a pH modifier to effect coupling. Since diazonium salts are thermally unstable, it is necessary to operate at a low temperature, normally below 10° C., thus requiring the use of ice. Since it is not always possible or practical on a commercial scale to maintain the diazo salt at temperatures below which decomposition occurs, the resulting azo dyes may contain impurities, from decomposed diazo, and are not always consistent in quality.

In addition to the above, the usual method of azo dye production requires the coupling reaction vessel to have reserve volume to accommodate both reactive masses. Moreover, since the diazotization reaction must be completed before coupling can be effected, the overall diazotization and coupling reaction time is long, the overall results being that production costs are high.

Some azo dyes can be prepared in one-step operations. U.S. Pat. 2,478,768 of Locke discloses a process for making an azo lake, in which process diazotization, coupling and laking are carried out in a single medium at pH above 6. An aqueous acid solution of a laking agent and/or an azo color component is added to an aqueous alkaline solution of a soluble nitrite and at least one azo color component while maintaining the reaction mix at a pH of at least 6.0. The disclosed couplers are phenolic types which require relatively high pH for coupling and the resulting azo colors are required to have at least one water solubilizing acid group.

U.S. Pat. 2,478,767 of Locke discloses a one-step process for making an azo dye; diazotization and coupling are carried out in the same aqueous reaction medium by mixing aqueous solutions of the diazo and the coupling component in a vessel while maintaining a mix pH of 6.0 to 7.2. More specifically, Locke mixes an aqueous mineral acid solution of a diazo component free of water solubilizing acid groups and an aqueous alkaline solution of nitrite and beta-hydroxy-naphthoic acid, beta-hydroxy-naphthoic-o-anisidide or acetoacetanilide, as fast as diiazotization occurs, to produce a limited number of dyes which are useful as pigments.

U.S. Pat. 2,418,416 of Locke discloses a process for preparing a lakeable azo intermediate by (1) adding nitrite to an aqueous acid solution of a diazo component and a coupling component containing a water solubilizing acid group and a phenolic hydroxy group, at a pH below 4.0, and (2) raising the pH of the mixture to above 4.0 to provide coupling. Such a process may result in decomposition of some diazo prior to coupling.

SUMMARY OF THE INVENTION

It has been discovered that azo dyes can be conveniently and economically prepared in a one-step process by simultaneously contacting and reacting (a) a diazotizable aromatic amine,
(b) a coupling compound selected from active methylene compounds and aromatic amines which are not appreciably diazotizable in the reaction mixture and which have at least one unsubstituted position ortho or para to the amine group, and
(c) a diazotizing agent in a reaction mixture comprising (a), (b), (c) and an acidic liquid medium capable of dissolving at least a portion of each of (a) and (b) and capable of producing a pH of 4 or less when the reaction mixture is diluted with 25% its volume of water, while maintaining the concentration of the diazotizing agent and the temperature and acidity of the reaction mixture so that the rate of consumption of diazotizing agent is substantially the same as the rate of formation of azo dye.

DESCRIPTION OF THE INVENTION

The present invention involves bringing together in a liquid acidic reaction medium a diazotizable amine, azo dye coupler and diazotizing agent. As in the conventional two-step process the process of this invention requires about one mole of diazotizing agent per mole of diazotizable amine, with the amine and coupler being present in about equimolar proportions. Azo dye is formed as soon as diazotizing agent is present in the acid liquid phase containing both dye-forming intermediates in an at least partly dissolved state. The diazotization of the diazotizable aromatic amine and the instantaneous coupling of the diazotized amine to the coupling compound can take place under relatively mild nitrosating conditions, for example, with nitrous acid in formic acid, acetic acid or the like moderately strong organic acid media. Since aromatic amines, such as 2,6-dichloro-4-nitroaniline, which normally require stronger acid for diazotization, for example, nitrosylsulfuric acid, are also operable in the above organic acid media in accordance with the process of this invention, a simple diazotization-coupling sequence does not appear to be the only possible reaction path. It is to be understood, therefore, that the azo dyes produced by the present invention may not necessarily involve formation of a diazo intermediate.

The process can be conducted batchwise or continuously. It is convenient to mix diazotizing agent or a precursor thereof with a mixture of diazotizable amine and coupler in the acid liquid medium. Alternatively, the acid medium as a separate stream can be mixed with a mixture of diazotizable amine, coupler, liquid medium and diazotizing agent precursor.

As still another variation, separate streams of the recited ingredients, preferably in liquid and/or solution form, can be brought together simultaneously.

Under another variation, the diazotizing agent can be introduced as such into the liquid medium containing azo dye components. Such an agent can be nitrogen trioxide ($N_2O_3$), a mixed anhydride of nitrous acid and another acid, such as nitrosylsulfuric acid or nitrosyl chloride, an ester of nitrous acid, such as ethyl nitrite or tert-butyl nitrite, or nitrous acid in a suitable carrier solvent.

The diazotizing agent can be formed in the liquid medium containing the azo dye components, such as by forming nitrous acid in the liquid medium from a nitrous acid salt or ester by adding a suitable reactant, for example, an acidic material. The preferred manner of forming the diazotizing agent is by adding a nitrous acid salt, such as sodium nitrite, to the liquid medium containing acid strong enough to convert the nitrite to nitrous acid.

The liquid acid medium employed herein should be able to dissolve sufficient quantities of both the diazotizable amine and the coupler to allow the one-step azo dye formation to proceed at reasonable rates.

It is normally desirable that the acidic liquid medium dissolve at least about one percent of its weight of each of the diazotizable amine and the coupler. More desirably, the liquid should dissolve over 10%, preferably over 50% of each of these reaction components. The amount of liquid used may be only enough to produce a stirrable slurry or, especially in cases where the reaction component is very soluble, enough liquid may be used to completely dissolve the reaction components. Solubilities of the reactants in the acidic liquid medium chosen for conducting the one-step azo dye preparative process can be determined by standard methods. However, testing for minimum practical solubility of the diazotizable amine and of the coupler in the acidic liquid medium can be conducted simply and rapidly using the same standard tests which can be used to follow the course of the reaction. Presence of the diazotizable amine in the acidic liquid phase can be determined by addition of nitrite followed by sampling the solution and testing for the appearance of the diazotized intermediate by spot test coupling with standard coupler solution, e.g. alkaline H-acid. If coupling with the coupler component in the original reaction takes place instantaneously so that diazo cannot be detected, this test for minimum operable solubility can be carried out with the same acid liquid medium but without coupler present, or the reaction mixture can be analyzed for presence of the desired azo dye product. Presence of the coupler in solution can be readily determined by spot testing a sample with standard diazo solution, for example, diazotized p-nitroaniline.

It is preferred that both the diazotizable amine and the coupling compound be highly soluble in the liquid medium but that the azo dye product be much less soluble than its components to facilitate formation of a pure dye and recovery of the dye produced. Such conditions aid production of a dye of superior color quality, having little or no need of subsequent purification.

When a nitrite is added to the reaction mixture to provide the diazotizing agent, it should contain acid in excess of that required to convert the nitrite salt to nitrous acid. The excess acid should be sufficient to produce a pH of 4.0 or lower when a sample of the mixture is diluted with 25% its volume of water.

Typical acid liquid media include aqueous mineral acids, such as hydrochloric, hydrobromic, phosphoric and sulfuric acids, normally liquid organic acids having a primary ionization constant at 25° C. of at least $1.3 \times 10^{-5}$, such as formic, acetic and propionic acids and mixtures thereof. Acetic acid is preferred because of its availability and cheapness. However, when employing aromatic amines that normally are diazotizable only with difficulty, for example, 2,6-dichloro-4-nitroaniline and 2,4-dinitroaniline, formic acid, for example, as an 88% aqueous solution, is preferred.

Liquids useful herein may be mixtures of normally liquid components as well as mixtures of components which become liquid upon mixing. Useful normally liquid components include water; carboxamides, such as formamide, N,N-dimethylformamide, N,N-dimethylacetamide, tetramethylurea and cyclic amides, such as N-methylbutyrolactam; ketones, such as acetone and methyl ethyl ketone; aliphatic glycols, such as ethylene glycol and polyetyhleneglycols, and their ethers, such as monoalkylethers of ethyleneglycol and polyethyleneglycols; cyclic ethers, such as tetrahydrofuran, p-dioxane and m-dioxane; nitrogen substituted phosphoric triamide compounds, such as N,N,N',N',N'',N'' - hexamethylphosphoric triamide; polar nitro and halo substituted hydrocarbons, such as nitrobenzene, chloroform, tetrachloroethylene, o-dichlorobenzene and 2,4,5-trichlorobenzene and the like. Components providing the required acidity of the liquid medium, where needed, include mineral acids, such as hydrochloric, hydrobromic, phosphoric and sulfuric acids; organic acids, such as formic acid, acetic acid and propionic acid; hydroxycarboxylic acids, such as glycolic and lactic acids; arylcarboxylic acids, such as benzoic and the toluic acids; and arylsulfonic acids, such as p-toluenesulfonic acid.

Water, a preferred liquid component, ketones, glycols and glycol ethers may be used in combination with an organic or a mineral acid component. Dimethyl formamide, another preferred liquid, other carboxamides, cyclic ethers, and hexamethylphosphoric triamide are preferably combined with organic acids.

Though many of the aforesaid components are expensive, their cost is more than offset by their high solvent capability and the reduction of time and labor costs involved in their use in this process. The expense of using many of these components is reducible by their ready recovery through extraction and distillation methods.

Although the invention is applicable to azo dye production broadly, one important embodiment is directed to the production of azo dye pigments, useful as disperse dyes, which are devoid of such water-solubilizing groups as carboxy and sulfo groups. Thus, the amine and coupling components used in this invention can be free of such groups.

Typical diazotizable aromatic amines useful in this process include carbocyclic acid heterocyclic aromatic amines, nuclearly unsubstituted or nuclearly substituted with one or more groups, for example, nitro, chlorine, bromine, alkyl, alkoxy, cyano, carboxy, keto, arylazo, acylamino, sulfo and 'onium groups. These substituents may be present in combination in the aromatic amine, which is preferably an aniline.

Exemplifying such diazotizable amines are 4-nitroaniline; 3-nitroaniline;
2-nitroaniline; 2-chloro-4-nitroaniline;
2,6-dichloro-4-nitroaniline;
2,6-dibromo-4-nitroaniline;
4-aminoacetanilide; 2-nitro-4-methylaniline;
4-(o-tolylazo)-2-methylaniline; 4-aminoazobenzene;
4-nitrophenylazo-1-naphthylamine; 2,4-dinitroaniline;
2,5-dimethoxyaniline; 2-cyano-4-nitroaniline;
2,4-dinitro-6-chloroaniline; 2,5-diethoxyaniline;
4-cyanoaniline; 2-chloroaniline;
3-chloroaniline; 4-chloroaniline;
2,5-dichloroaniline; 4-chloro-2-nitroaniline;
o-toluidine; p-toluidine;
5-chloro-2-aminotoluene; 6-chloro-2-aminotoluene;
4-chloro-2-aminotoluene; 4-nitro-2-aminotoluene;
5-nitro-2-aminotoluene; m-aminobenzylalcohol;
2,3-xylidine; m-xylidene; 2,4-xylidene;
p-xylidene; 2,5-xylidene; p-butylaniline;
p-dodecylaniline; n-formyl-m-phenylenediamine;
n-oxalyl-m-phenylene diamine;
p-aminodiphenylamine; p-aminoacetanilide;
oxalyl-p-phenylenediamine;

2-amino-4-acetylaminotoluene;
benzidine; 3,3'-dichlorobenzidine;
2-nitrobenzidine; aniline;
4,4'-methylene-di(m-toluidine);
o-anisidine; o-phenetidine;
4-nitro-2-aminoanisole;
5-nitro-2-aminoanisole;
4-chloro-2-aminoanisole;
p-phentidine; p-anisidine;
1,3-di(p-aminophenoxy) propane;
4-amino-4-methoxydiphenylamine;
2-nitro-4-aminoanisole;
3-nitro-4-aminoanisole;
p,p'-thiodianiline; p,p'-oxydianiline;
4-aminodiphenylether; 5-methyl-o-anisidine;
2-ethoxy-1-naphthylamine; α-naphthylamine;
dianisidine; 4-carbomethoxyamino-2,5-diethoxyaniline;
4-benzylamino-2,5-diethoxyaniline;
di(4'-aminobenzoyl)-m-phenylenediamine;
3-amino-4-methylbenzonitrile;
4-(picolinylamino)-2,5-diethoxyaniline;
1-(m-aminophenyl)-3-methyl-5-pyrazolone;
2-cyano-4-nitroaniline;
4,4'-diphenylsulfone; 4-methylsulfonylaniline;
1-amino-2,3,4,5-tetracyanocyclopentadiene;
2-(o-aminophenyl)-2,1,3-benzotriazole;
2-(o-aminophenyl)-2,1,3-α,β-naphthotriazole;
4-aminobenzophenone; 4-aminoacetophenone;
4-(p-nitrophenylazo)-2,5-dimethoxyaniline;
4-(2,6-dichloro-4-nitrophenylazo)-2,5-dimethoxyaniline;
2,4-dicyanoaniline; 3-chloro-4-cyanoaniline;
o-aminobenzotrifluoride;
5-chloro-2-aminobenzotrifluoride;
dehydrothio-p-toluidine; 4'-amino-2-chlorobenzophenone;
4-amino-2,4-dichlorobenzophenone;
2-amino-4'-bromobenzophenone;
3'-amino-3-bromo-4-methylbenzophenone;
2'-amino-2,5-dimethylbenzophenone;
4-amino-4'-ethylbenzophenone;
2-amino-4'-methoxybenzophenone;
2'-amino-4-methoxy-2,5-dimethylbenzophenone;
3'-amino-3,4-dimethoxybenzophenone;
4'-amino-5-chloro-2-methoxybenzophenone;
4-amino-4'-methoxybenzophenone;
3-amino-4'-methoxybenzophenone;
2-amino-2'-nitrobenzophenone;
2-amino-3'-nitrobenzophenone;
α-aminoanthraquinone; β-aminoanthraquinone;
4-amino-4'-nitrobenzophenone;
4'-amino-2,4-dinitrobenzophenone;
4'-amino-2,4-dinitrobenzophenone;
4'-amino-4-methyl-3-nitrobenzophenone;
4-amino-4'-butylbenzophenone;
4-amino-4'-propoxybenzophenone;
2-amino-4'-fluorobenzophenone;
4-amino-2-propylbenzophenone;
2-amino-4,5-dipropoxybenzophenone;
2-amino-5-bromobenzophenone;
4-amino-3-chlorobenzophenone;
2-amino-4,5-dichlorobenzophenone;
4-amino-3,5-dibromobenzophenone;
4-amino-2-methylbenzophenone;
2-amino-5-methylbenzophenone;
2-amino-4,5-dimethylbenzophenone;
3-amino-2,4-dimethylbenzophenone;
2-amino-4,5-dimethoxybenzophenone;
2-amino-4-methoxybenzophenone;
3-amino-5-nitrobenzophenone;
3-amino-4-methyl-5-nitrobenzophenone;
2-amino-6-methyl-3-nitrobenzophenone;
2-amino-3,5-dinitrobenzophenone;
2-amino-4-methyl-3,5-dinitrobenzophenone;
2-amino-5-fluorobenzophenone;
4-chloro-2-(p-chlorophenylsulfonyl(aniline;
p-(p-bromophenylsulfonyl)aniline;
2-chloro-4-(phenylsulfonyl)aniline;
2-chloro-6-(phenylsulfonyl)aniline;
3-chloro-2-(phenylsulfonyl)aniline;
3-chloro-4-(phenylsulfonyl)aniline;
5-chloro-2-(phenylsulfonyl)aniline;
4-chloro-3-(phenylsulfonyl)aniline;
4-chloro-2-(phenylsulfonyl)aniline;
2-bromo-4-(phenylsulfonyl)aniline;
p-(2,4-dichlorophenylsulfonyl)aniline;
p-(2,5-dibromophenylsulfonyl)aniline;
p-(3,4-dichlorophenylsulfonyl)aniline;
5-chloro-2-(p-tolylsulfonyl)aniline;
p-(p-tolylsulfonyl)aniline;
p-(p-propylphenylsulfonyl)aniline;
p-(p-fluorophenylsulfonyl)aniline;
p-(3-chloro-4-methoxyphenylsulfonyl)aniline;
p-(2,4-dimethoxyphenylsulfonyl)aniline;
p-(3,5-dimethoxyphenylsulfonyl)aniline;
p-(p-methoxyphenylsulfonyl)aniline;
p-(p-ethoxyphenylsulfonyl)aniline;
p-(2-methoxy-4-nitrophenylsulfonyl)aniline;
o-(p-methoxyphenylsulfonyl)aniline;
p-(o-methoxyphenylsulfonyl)aniline;
p-(p-nitrophenylsulfonyl)aniline;
2-nitro-3-(phenylsulfonyl)aniline;
2-nitro-5-(phenylsulfonyl)aniline;
2,4-dinitro-5-(phenylsulfonyl)aniline;
2-nitro-4-(p-nitrophenylsulfonyl)aniline;
2-nitro-4-(m-nitrophenylsulfonyl)aniline;
o-(o-nitrophenylsulfonyl)aniline;
2-nitro-4-(phenylsulfonyl)aniline;
2-nitro-4-(p-tolylsulfonyl)aniline;
2,6-dinitro-4-(p-tolylsulfonyl)aniline;
4-(p-butoxyphenylsulfonyl)-3-ethylaniline;
p-(2,5-xylylsulfonyl)aniline;
p-(2,4-xylylsulfonyl)aniline;
p-(2,4-dinitrophenylsulfonyl)aniline;
2,4-dichloro-5-(phenylsulfonyl)aniline;
2,3-diethyl-4-(phenylsulfonyl)aniline and
2,5-dimethoxy-4-(phenylsulfonyl)aniline.

Heterocyclic diazotizable amines can also be used in the present invention. Some representative compounds follow:

2-aminobenzothiazole;
2-amino-4-chlorobenzothiazole;
2-amino-4-bromobenzothiazole;
2-amino-4-nitrobenzothiazole;
2-amino-4-cyanobenzothiazole;
2-amino-6-bromobenzothiazole;
2-amino-6-cyanobenzothiazole;
2-amino-6-nitrobenzothiazole;
2-amino-6-(trifluoromethyl)benzothiazole;
6-acetyl-2-aminobenzothiazole;
2-amino-6-(trifluoroacetyl)benzothiazole;
2-amino-6-valerylbenzothiazole;
2-amino-6-(beta-hydroypropionyl)benzothiazole;
2-amino-6-(cyclohexylcarbonyl)benzothiazole;
2-amino-6-p-toluoylbenzothiazole;
2-amino-6-(o-chlorobenzoyl)benzothiazole;
2-amino-6-(p-bromobenzoyl)benzothiazole;
2-amino-6-(m-nitrobenzoyl)benzothiazole;
2-amino-6-(methylsulfonyl)benzothiazole;
2-amino-6-(2-hydroxyethylsulfonyl)benzothiazole;
2-amino-6-(propylsulfonyl)benzothiazole;
2-amino-6-(cyclohexylsulfonyl)benzothiazole;
2-amino-6-(phenylsulfonyl)benzothiazole;
2-amino-6-(o-tolylsulfonyl)benzothiazole;
2-amino-6-(m-chlorophenylsulfonyl)benzothiazole;
2-amino-6-(p-bromophenylsulfonyl)benzothiazole;
2-amino-6-(m-nitrophenylsulfonyl)benzothiazole;
2-amino-6-(ethoxycarbonyl)benzothiazole;
2-amino-6-(butoxycarbonyl)benzothiazole;
2-amino-6-(trifluoromethylsulfonyl)benzothiazole;
2-amino-4-bromo-6-nitrobenzothiazole;

2-amino-4,6-dinitrobenzothiazole;
2-amino-4,6-dicyanobenzothiazole;
2-amino-6-bromo-4-methylbenzothiazole;
2-amino-4-methoxy-6-nitrobenzothiazole;
2-amino-6-bromo-4-propoxybenzothiazole;
2-amino-4-cyano-6-nitrobenzothiazole;
2-amino-6-chloro-4-cyanobenzothiazole;
2-amino-6-chloro-4-nitrobenzothiazole;
2-amino-6-bromo-4-cyanobenzothiazole;
2-amino-5-cyano-4-methylbenzothiazole;
2-amino-6-methyl-4-nitrobenzothiazole;
2-amino-6-methoxy-4-nitrobenzothiazole;
2-amino-6-butoxy-4-chlorobenzothiazole;
2-amino-4-chloro-6-methoxybenzothiazole;
2-amino-4-bromo-6-methoxybenzothiazole;
2-amino-4,6-dichlorobenzothiazole;
2-amino-4,6-dibromobenzothiazole;
2-amino-4-methyl-6-(trifluoromethyl)benzothiazole;
2-amino-4-methyl-6-propionylbenzothiazole;
2-amino-4-chloro-6-(methylsulfonyl)benzothiazole;
2-amino-6-(methylsulfamoyl)-4-nitrobenzothiazole;
2-amino-4-chloro-6-(cyclohexylsulfonyl)benzothiazole;
2-amino-4-bromo-6-(ethylsulfonyl)benzothiazole;
2-amino-N,N-dimethyl-4-nitro-6-benzothiazolesulfonamide;
2-amino-N-benzyl-4-chloro-N-ethyl-6-benzothiazolesulfonamide;
2-amino-4-bromo-N-ethyl-6-benzothiazolesulfonanilide;
2-amino-N,N-dipropyl-4-methyl-6-benzothiazolesulfonamide;
2-amino-4-chloro-6-(methoxycarbonyl)benzothiazole;
2-amino-4-bromo-6-(butoxycarbonyl)benzothiazole;
2-amino-6-benzoylbenzothiazole;
2-amino-6-acetylbenzothiazole;
2-amino-N,N-dibutyl-6-benzothiazolesulfonamide;
2-amino-N-ethyl-6-benzothiazolesulfonamide;
2-amino-N-butyl-N-methyl-6-benzothiazolesulfonamide;
2-amino-N-benzyl-N-ethyl-6-benzothiazolesulfonamide;
2-amino-N-benzyl-6-benzothiazolesulfonamide;
2-amino-N-isopropyl-N-methyl-6-benzothiazolesulfonamide;
2-amino-N-isobutyl-6-benzothiazolesulfonamide;
2-amino-N,N-diethyl-6-benzothiazolesulfonamide;
2-amino-N-sec-butyl-6-benzothiazolesulfonamide;
2-amino-N,N-dimethyl-6-benzothiazolesulfonamide;
2-amino-N,N-dipropyl-6-benzothiazolesulfonamide;
5-nitro-2-aminothiazole;
5-methylsulfonyl-2-aminothiazole;
5-benzoyl-2-aminothiazole;
2-aminoimidazole;
4,5-dicyano-2-aminoimidazole;
4,5-diphenyl-2-aminothiazole;
3-aminopyridine;
2-aminopyridine-N-oxide;
2-aminothiophen;
2-amino-3,4-thiadiazole;
2-amino-3,5-thiadiazole;
2-aminobenzimidazole;
3-amino-1,2,4-triazole;
3-aminobenzisothiazole;
3-amino-5-chloro-benzisothiazole;
3-amino-5-sulfobenzisothiazole;
2-amino-3,4-oxadiazole;
2-amino-3-cyano-tetrahydrobenzthiophene;
3-aminocarbazole.

Diazo components containing cationic groups and operable herein are:

(p-aminophenacyl) trimethylammonium chloride;
3-amino-7-diethylamino-5-phenylphenazinium chloride;
3,7-diamino-2,8-dimethyl-5-phenylphenazinium chloride;
3-amino-7-diethylamino-2-methyl-5-phenylphenazinium chloride;
[2(p-aminobenzoyl)ethyl] trimethylammonium chloride;
3-(p-aminobenzoyl)propyl triethylammonium bromide;
(4-amino-3-bromophenacyl) trimethylammonium chloride;
(4-amino-2,5-dimethylphenacyl) trimethylammonium chloride;
(4-amino-2-chlorophenacyl) trimethylammonium chloride;
(4-amino-3,5-dibromophenacyl) trimethylammonium chloride;
2-(p-aminostyryl)-1-methylpyridinium methosulfate;
2-(p-aminostyryl)-5-ethyl-1-methylpyridinium methosulfate;
(p-aminophenacyl)dimethyl(2-hydroxyethyl)ammonium chloride, sulfate and phosphate;
(3'-amino-4-methylphenacyl) trimethylammonium chloride;
(4'-amino-3'-chlorophenacyl)dimethylbenzylammonium sulfate;
4'-amino-2',5'-dimethylphenacyl)dimethyl(2-hydroxyethyl)ammonium phosphate;
(3-amino-4-methoxyphenacyl)trimethylammonium chloride;
(p-amino-alpha-methyl phenacyl)trimethylammonium chloride.

Some representative aminocarboxylic acid and aminosulfonic acid aromatic derivatives of use as diazo components are:

anthranilic acid;
4-chloroanthranilic acid;
p-aminobenzoic acid;
m-aminobenzoic acid;
4-aminosalicyclic acid;
orthanilic acid;
metanilic acid;
sulfanilic acid;
4-chlorometanilic acid;
6-chlorometanilic acid;
2-amino-5-chlorobenzene-sulfonic acid;
2,5-dichlorosulfanilic acid;
2-amino-5-nitrobenzenesulfonic acid;
3-chloroaniline-5-sulfonic acid;
3-amino-5-chloro-o-toluenesulfonic acid;
2-aminotoluene-5-sulfonic acid;
2-amino-6-chlorotoluene-3-sulfonic acid;
3-amino-6-chlorotoluene-2-sulfonic acid;
2-chloro-5-aminotoluene-4-sulfonic acid;
3-aminotoluene-6-sulfonic acid;
3-aminotoluene-3-sulfonic acid;
m-xylidine sulfonic acid;
4,6-diamino-m-toluene sulfonic acid;
4-acetylaminoaniline-2-sulfonic acid;
2-(p-aminoaniline)-5-nitrobenzene sulfonic acid;
6-(p-toluidino)metanilic acid;
5-amino-2-(p-methoxyanilino)benzenesulfonic acid;
1-amino-2-naphthalene sulfonic acid;
5-amino-1-naphthalenesulfonic acid;
5-amino-2-naphthalenesulfonic acid;
8-amino-2-naphthalenesulfonic acid;
8-amino-1-naphthalenesulfonic acid;
5-acetamido-8-amino-2-naphthalenesulfonic acid;
8-acetamido-5-amino-2-naphthalenesulfonic acid;
6-amino-2-naphthalenesulfonic acid;
aniline-2,5-disulfonic acid;
8-amino-1,6-naphthalenedisulfonic acid;
7-amino-1,3-naphthalenedisulfonic acid;
6-amino-1,3-naphthalenedisulfonic acid;
4,4'-diamino-2,2'-stilbenedisulfonic acid;
4,4'-diaminodiphenyl-2,2'-disulfonic acid;
3,3'-dimethyl-4,4'-diaminodiphenyl-6,6'-disulfonic acid;
4-methoxymetanilic acid;
4-methoxy-6-nitrometanilic acid;
2-ethoxy-1-naphthylamine-6-sulfonic acid;
6-(p-aminobenzamido)-1-naphthol-3-sulfonic acid;
p-(p-aminophenylazo)benzene sulfonic acid;

p-(4-amino-3-methoxyphenylazo)benzenesulfonic acid;
4-(4-amino-m-tolylazo)-m-toluenesulfonic acid;
2-hydroxy-5-aminobenzoic acid;
1-(m-aminophenyl)-5-oxo-2-pyrazolone-3-carboxylic acid;
dehydrothio-p-toluidine sulfonic acid.

Useful coupling components in this invention are (1) aromatic amine compounds having no diazotizable amino group or a relatively non-reactive amino group as compared to the amino group of the diazo component and (2) compounds having an active methylene group.

Usually aromatic amine compounds most satisfactory have a nuclearly-attached tertiary nitrogen atom and an unsubstituted nuclear position ortho to or preferably para to the tertiary nitrogen atom.

Substituents on the tertiary nitrogen atom can be alkyl of 1 to 3 carbons, such as methyl, ethyl and propyl, preferably methyl or ethyl; hydroxyethyl; cyanoalkyl of 2 to 4 carbons, such as cyanomethyl, β-cyanoethyl or 2-cyanopropyl, preferably β-cyanoethyl; acyloxyalkyl in which the acyl group is aliphatic acyl having 2–5 carbons, such as acetyl, propionyl and butyryl, preferably acetyl, or is arylacyl having 7 to 10 carbons, such as benzoyl, toluoyl or xyloyl, preferably benzoyl, and in which the alkyl moiety has 2 to 4 carbons, such as ethyl (preferred) and propyl.

Typical tertiary amines are:

dimethylaniline,
diethyl-m-toluidine;
di-(n-propyl)-o-toluidine;
N-methyl-N-(2'-cyanoethyl)aniline;
N,N-bis(2'-cyanoethyl)aniline;
N-methyl-N-(3'-cyanopropyl)-m-toluidine;
N-cyanomethyl-N-(2'-acetoxyethyl)aniline;
N,N-bis(2'-acetoxyethyl)aniline;
N,N-bis(3'-butyryloxypropyl)-m-toluidine;
N,N-bis(2'-benzoyloxyethyl)-m-toluidine;
N,N-bis[2'H(polyoxyethyl)]-m-toluidine-N-(2'-benzoyloxyethyl)aniline;
N-ethyl-N-(2'-cyanoethyl)aniline;
N-ethyl-N-(2'-cyanoethyl)-m-toluidine;
N-(2'-cyanoethyl)-N-(2'-hydroxyethyl)aniline;
2-(N-ethylanilino)ethanol;
phenyldiethanolamine;
N,N-bis(2-hydroxyethyl)-m-toluidine;
N-(2-cyanoethyl)-N-(2'-mesitoyloxyethyl)aniline;
N-(2-cyanoethyl)-N-(2'-mesitoyloxyethyl)aniline;
m-chlorodimethylaniline.

Useful tertiary amines may bear other substituents. When other substituents are used, a preferred position for at least one of them is meta to the tertiary amine group. Other substituents can be methyl; alkoxy of one or two carbons; and acylated amino groups in which the acylating group is aryl carboxyacyl of 7 to 10 carbons, such as benzoyl, toluoyl, xyloyl and mesitoyl, preferably benzoyl, alkanesulfonyl of 1 to 3 carbons, such as methanesulfonyl, ethanesulfonyl and propanesulfonyl, preferably methanesulfonyl, or arylsulfonyl of 6 to 7 carbons, such as benzenesulfonyl or p-toluenesulfonyl (preferred). Other compounds useful herein include:

N,N-bis-(2'-acetoxyethyl)-N'-benzoyl-m-phenylenediamine;
N,N-bis-(2'-benzoyloxyethyl)-N'-benzoyl-m-phenylenediamine;
2-methoxy-5-benzoylamino-N,N-diethylaniline;
N,N-bis(2'-benzoyloxyethyl)N'-methanesulfonyl-m-phenylenediamine and N,N-bis(2'-benzoyloxyethyl)-N'-tosyl-m-phenylenediamine;
N,N-bis(2-acetoxyethyl)-N'-methanesulfonyl-m-phenylenediamine;
N,N-dimethyl-2-methoxy-5-methylaniline;
N,N-bis(2-hydroxyethyl)-2-methoxy-5-chloroaniline;
N,N-dimethyl-2,5-dimethoxyaniline;
N-methyl-N-(2,3-dihydroxypropyl)-2-chloro-5-methylaniline;
N-(2-methoxyphenyl)morpholine;
N-methyldiphenylamine;
N,N-(2-hydroxyethyl)-2-chloro-5-(p-nitrobenzamido)aniline;
N-ethyl-2-chloro-5-(2,4-dimethoxybenzamido)aniline;
N-(2-cyanoethyl)-2,5-dimethoxyaniline;
N-(2-cyanoethyl)-2-methoxy-5-benzamido)aniline;
N-ethyl-N-(2-cyanoethyl)cresidine;
N,N-bis-(2-cyanoethyl)-m-anisidine;
N,N-dimethyl-N'-(o-anisoyl)-m-phenylenediamine;
3'-(dimethylamino)benzanilide;
N-methyl-N-(2,3-dihydroxypropyl)-m-toluidine;
N-(2-cyanoethyl)-o-chloroaniline;
N-(2-cyanoethyl)-N-(benzoyloxyethyl)aniline;
N-ethyl-N-(2-cyanoethyl)aniline.

As is obvious from the above, the coupler can contain nuclearly substituted water-solubilizing groups, such as carboxy and sulfo.

Compounds with activated methylene groups used as coupling compounds can be selected from β-diketone, such as benzoylacetone, 1,3-cyclohexanedione, and 1,3 perinaphthalindanedione; beta-keto esters, such as ethyl acetoacetate, diethyl malonate, phenylacetoacetate, methyl 4,4,4-trifluoroacetoacetate, and methyl p-nitrobenzoylacetate; beta-keto amides, such as acetoacet-4'-chloroanilide, acetoacetotoluidide, benzoylacet-3'-methoxyanilide, benzoylacet-α,β-naphthylamide, and N,N'-ditolylmalonamide; beta-keto nitriles, such as benzoylacetonitrile, 2'-thenoylacetonitrile, anisoylacetonitrile, 1-naphthoylacetonitrile, and p-nitrocinnamoylacetonitrile; anilides of cyanoacetic acid, such as 2-cyanoacetanilide, 2-cyano-p-acetanisidide, and 2-cyano-4'-nitroacetanilide; heterocyclic beta-keto amides, such as barbituric acid and N-substituted barbituric acids; and β-imino amides, such as 1-phenyl-3-methylpyrazol-5-one, 1-hydroxymethyl-3-methylpyrazol-5-one, 2-iminobarbituric acid, and 1-(alpha-naphthyl)-3-methylpyrazol-5-one. Similarly, azo dyes are obtained when methylphenylpyrazolone is replaced by other heterocyclic couplers. Such couplers include:

1-phenyl-5-pyrazolone;
3-methyl-5-pyrazolone;
3-ethyl-5-pyrazolone;
1-phenyl-3-ethoxycarbonyl-5-pyrazolone;
1-phenyl-3-butoxycarbonyl-5-pyrazolone;
1-phenyl-3-phenoxycarbonyl-5-pyrazolone;
1-phenyl-3-carbamoyl-5-pyrazolone;
1-phenyl-3-methylcarbamoyl-5-pyrazolone;
1-phenyl-3-dimethylcarbamoyl-5-pyrazolone;
1-phenyl-3-phenylcarbamoyl-5-pyrazolone;
1-phenyl-3-(2-hydroxyethyl-carbamoyl)-5-pyrazolone;
2-methylindole;
5-bromo-2-methylindole;
carbasol-2-ol;
3-dibenzofuranol;
5-quinolinol;
8-quinolinol;
5-isoquinolinol;
2,4-quinolinediol;
1-(m-nitrophenyl)-3-methyl-5-pyrazolone;
1-(p-nitrophenyl)-3-methyl-5-pyrazolone;
1,2,3,4-tetrahydro-6-methoxyquinoline;
1,2,3,4-tetrahydro-7-methylquinoline;
1,2,3,4-tetrahydro-1-methylquinoline;
1,2,3,4-tetrahydro-1-(2-hydroxyethyl)quinoline;
3,4-dihydro-2H-1,4-benzoxazine (benzomorpholine);
4-ethyl-3,4-dihydro-2H-1,4-benzoxazine;
4-(2-cyanoethyl)-3,4-dihydro-2H-1,4-benzoxazine julolidine;
2-acetamidothiophene,
2-benzamidothiophene, 2-dimethylaminothiazole;
indazol-6-ol;
2-phenylindole;

1-dimethylaminomethyl-3-methylpyrazol-5-one; and
1,3,3-trimethyl-Δ², α-indoline.

Pendant tertiary amine coupling components can be coupled with the diazo compounds to form dyes for anionic fibers, or these couplers can first be converted to their quaternary ammonium derivatives with appropriate reagents and then coupled to diazos to provide cationic dyes. Some representative examples of both coupler types are illustrated below.

[2-(N-methyl-3-ethylanilino)ethyl]trimethylammonium chloride;
[2-(N-butyl-m-anisidino)ethyl]triethylammonium chloride;
benzyldimethyl[2-(N-2-cyanoethylanilino)ethyl]ammonium chloride;
[2-(N-2-hydroxyethyl-2-chloro-5-methylanilino)ethyl] trimethylammonium chloride;
benzyldimethyl[2-(N-2-cyanoethylanilino)-ethyl]ammoniuum chloride;
[2-(N-ethyl-2-chloro-5-methoxyanilino)ethyl]-2-hydroxyethyldimethylammonium chloride;
diethylmethyl[2-(o-anisidino)ethyl]ammonium methosulfate;
diethylmethyl[2-(5-chloro-o-anisidino)ethyl]ammonium methosulfate;
diethylmethyl[2-(2,5-dimethoxyanilino)ethyl]ammonium methosulfate;
diethylmethyl[2-(5-methyl-o-anisidino)ethyl]ammonium methosulfate;
[2-(N-ethylanilino)-1-methylethyl]trimethylammonium chloride;
[3-(N-methyl-m-toluidino)-2-methylpropyl]trimethylammonium chloride;
[4-(N-ethyl-m-anisidino)butyl]trimethylammonium chloride;
diethylmethyl[3-(N-ethyl-m-toluidino)propyl]ammonium methosulfate and
[2-(N-ethylanilino)ethyl]trimethylammonium chlordine;
3-(N-ethyl-m-toluidino)-2-hydroxypropyltrimethylammonium chloride;
3-(N-ethylanilino)-2-hydroxypropyltrimethylammonium chloride;
[2-(N-methyl-3-methanesulfonamidoanilino)propyl] methyldiethylammonium methosulfate;
[2-(o-chloroanilino)ethyl]diethylmethylammonium methosulfate;
N,N,N'-triethyl-N'-phenylethylenediamine;
N-benzyl-N'-ethyl-N-methyl-N'-phenylenediamine;
N,N,N'-triethyl-N'-m-tolylethylenediamine;
N,N-diethyl-N'-methylphenylmethylenediamine;
3-(N-ethyl-m-toluidino)-2-hydroxypropyldiethylamine;
N,N-diethyl-N'-(o-chlorophenyl)ethylenediamine;
N,N-diethyl-N'-(o-bromophenyl)ethylenediamine;
N,N,N'-triethyl-N'-phenylpropylenediamine;
N,N-dimethyl-N'-ethyl-N'(2-methoxy-5-acetamidophenyl ethylenediamine;
N-ethyl-N-(2-hydroxyethyl)-N'-methyl-N'-phenylethylenediamine;
N,N-dipropyl-N'-(2-cyanoethyl)-N'-(3-ethylphenyl) ethylenediamine;
N,N-diethyl-N'-(2-hydroxyethyl)-N'-(m-chlorophenyl)-ethylenediamine;
N,N-diethyl-N'-ethoxyethyl-N'-(2-methyl-5-methoxyphenyl)ethylenediamine;
N,N-dimethyl-N'-methyl-N'-(2,5-dimethoxyphenyl) ethylenediamine;
N,N,N'-trismethyl-N'-(2-methyl-5-benzenesulfonamidophenyl)propylenediamine;
N,N-dimethyl-N'-ethyl-N'-(3-butyramidophenyl)-ethylenediamine.

Amine couplers other than tertiary aromatic amines can also be used provided they are not diazotizable or are difficult to diazotize under the conditions of the process of the invention. The suitability of a particular combination of a diazotizable amine, as described above, with a potentially diazotizable coupler compound, as illustrated below, can readily be deetermined by trial. Some non-tertiary amine couplers of this type which can be used include 7-amino-1-naphtholsulfonic acid, 8-anilino-1-naphthalenesulfonic acid, 8-p-toluidino-1-naphthalenesulfonic acid, and 6-anilino-1-naphtholsulfonic acid. Under the conditions of this invention, the amino-substituted couplers which also bear phenolic hydroxy groups preferentially couple ortho or para to the amino function (not to the hydroxyl group) should the unsubstituted position also be available ortho or para to the hydroxyl group.

The reaction mixture used in this invention should have a pH of 4.0 or lower (determined by diluting a sample of reaction mixture with 25% its volume of water). In some cases the process can be carried out at a pH as low as 0.1, but the pH preferably is in the range of 2 to 4. Buffers can be used if necessary to maintain the pH within the desired range. Useful buffers include salts of bases and acids of lesser ionization constants than the bases, such as disodium phosphate, sodium acetate, calcium citrate, potassium tartrate or sodium borate.

It is to be understood that the reaction mixture described above will be formed and will be of such acidity and temperature that the desired azo dye is formed substantially immediately so as to avoid undue accumulation of unreacted normally heat-sensitive diazonium compounds in the reaction mixture. For this purpose the course of the reaction is easily monitored by following the appearance of the colored product, using thin layer chromatographic techniques. If desired, the disappearance of other reaction components can be followed by standard tests.

Preferably, the above recited conditions are adjusted so that practically immediately on bringing together the diazotizing agent, the diazotizable amine and the coupler in the liquid acid medium, neither the diazotizing agent nor the diazotized amine are detectable or are only barely detectable in the reaction mixture. In other words, the rate of consumption of diazotizing agent and the rate of formation of azo dye should be substantially the same.

Generally, for a given amine-coupler combination the choice of diazotizing agent and the acid and its proportion in the reaction mixture can be varied to provide suitable coupling conditions. Likewise the nature of and the proportion of the liquid component of the mixture can be varied widely to solubilize the reactants in accordance with the requirements set forth above so as to facilitate the formation of azo dye in good yield and in high purity. For example, with coupling components containing basic tertiary amine groups, an aqueous acid, for example, 10% hydrochloric acid, or an organic acid, for example, formic, acetic or propionic acid, is suitable. With active methylene compounds it is highly desirable to employ acidic organic media, such as the above carboxylic acids, preferably acetic acid, and to maintain the pH at 2 to 4. It is often advantageous, such as N,N-dimethyl formamide or N,N-dimethyl acetamide. In addition to their solubilizing action, N-alkyl carboxamides, such as those above, provide buffering action and facilitate the coupling reaction.

The rate at which diazotizing agent should contact the dye components, that is, the concentration which should be maintained in the reaction mixture, depends on the availability of dissolved diazotizable amine and the availability of dissolved coupler to complete the formation of azo dye. Preferably, the diazotizing agent should be added about as fast as it can be consumed with formation of azo dye. Where nitrous acid is formed in the liquid medium, as by adding a 30% solution of sodium nitrite, the time of addition can range from a few minutes to several hours. The necessary rate is easily determined by simple tests, for example, using starch iodide reagent.

The present invention normally is carried out at a temperature from 0° C. up to about 30° C., preferably at 10° to 25° C. The temperature of the reaction mixture can be allowed to rise to as high as about 100° C., but preferably not above 35° C. Where high concentrations of reactants (25% or higher) are used, external cooling can be used to control the temperature; lower concentrations of reactants (below 20%) require little or no cooling.

This invention permits the use of higher concentrations of reactive components and the formation of more concentrated azo dye reaction mixtures than heretofore possible because it avoids the use of separate quantities of diluent for each azo dye component. It is practical to use reaction mixtures which contain in excess of 50% dye components in solution. Higher concentrations can be used without requiring complete solution of the dye components. The use of an amino azo compound as a diazotizable amine generally requires that the reaction mixture be more dilute in azo dye components. Preferred ranges of azo dye components in the reaction mixture are 15 to 40% in the case of monoazo dye formation, 8 to 15% in the case of disazo dye formation.

The high concentration of reactants usable in this process makes possible the formation of dyes in larger particle sizes than by multi-step processes. The particles form early during the process and grow within continued formation of the dye. The dye particles produced may be as much as 40 times the size of those made by multi-step processes. The resulting larger dye particles have much greater filterability and retain less of the liquid media. Filtration rates of some azo dyes made by this process are superior in filtering rate to corresponding azo dyes made by multi-step processes by a factor of 60. Azo dyes formed from complete solutions of azo dye components often produce the largest size dye particles and have the easiest filterability, the highest solids content and the lowest content of dye impurities. Decomposed diazotized amines are not a significant impurity in dyes made by this process.

Dyes prepared by this process are useful dyes for coloring synthetic and natural materials such as polyacrylonitrile, polyamide and polyester fibers, cotton and its blends, and wool by standard methods well known to the art.

In the following examples parts and percentages are by weight, unless otherwise stated, except where parts refer to volumes, in which case the volume is that occupied by the same number of parts of water. Colors given for the dyes produced are the colors produced on polyester fibers unless otherwise stated.

EXAMPLE 1

Preparation of

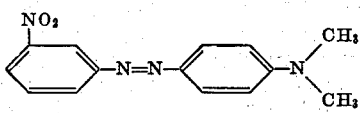

A solution of 150 parts water, 13.9 parts 3-nitroaniline, 12.7 parts N,N-dimethylaniline and 34.5 parts 37% hydrochloric acid was cooled to 0° C. 48 parts of 15% sodium nitrite solution were added steadily during one-half hour. A reddish-brown precipitate formed.

The mixture was stirred an additional hour at 0–5° C., then for two hours while warming to room temperature. The precipitate was collected by filtration. The filter cake was washed with 50 parts 1% hydrochloric acid, then with water until the filter cake was free of acid. 38 parts wet filter cake containing 59% solids were recovered.

The filter cake after drying was an orange powder. A sample recrystallized from isopropyl alcohol melted at 149–150° C. and had the same melting point in admixture with a product made by coupling a separate diazo of 3-nitroaniline with N,N-dimethylaniline. The infrared absorption spectra of the recrystallized dye and the comparison product were identical.

EXAMPLE 2

Preparation of

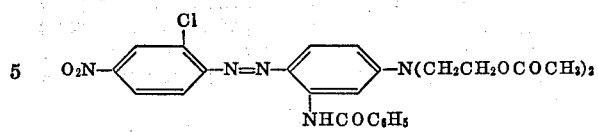

A solution was formed from 38.4 parts 3-[bis(2'-acetoxyethyl)amino]benzanilide, 51.7 parts glacial acetic acid, 17.42 parts 2-chloro-4-nitroaniline and 14.8 parts 37% hydrochloric acid. The solution had a volume of 120 parts.

While the solution temperature was controlled at 25–28° C. by ice addition, 28.2 parts 25% aqueous sodium nitrite solution were added during 60 minutes. Prior to filtration the volume was 160 parts and the pH was 0.4. The reaction mixture was filtered and the solids were washed with water. 118 parts filter cake yielded 54.3 parts dry cake containing 82% of azo dye identical to the red dye produced by the coupling of 3-[bis(2'-acetoxyethyl)amino]benzanilide to separately diazotized 2-chloro-4-nitroaniline.

When similar amounts of diazo and coupler components were coupled by a conventional aqueous multi-step procedure, the reaction mass had a volume of 710 parts.

EXAMPLE 3

Preparation of

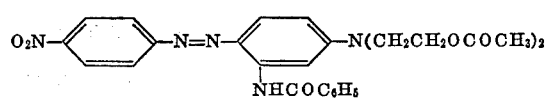

A solution was formed from 38.4 parts 3-[bis(2'-acetoxyethyl)amino]benzanilide, 13.95 parts 4-nitroaniline, 45.5 parts glacial acetic acid and 13.9 parts 37% aqueous hydrochloric acid. The solution had a volume of 97 parts.

28.2 parts 25% sodium nitrite solution were added to the solution during 15 minutes while it was maintained at a temperature of 25° C. by ice addition. The resulting reaction mixture had a volume of 160 parts and a pH of 0.1. 98.4 parts filter cake produced 52.4 parts dry cake containing 89.6% of the azo dye identical to that produced by coupling 3-[bis(2'-acetoxyethyl)amino]benzanilide to separately diazotized 4-nitroaniline in a conventional aqueous multi-step procedure.

Preparation of this dye from similar amounts of diazo and coupler components by conventional aqueous multi-step procedure produced a reaction mass with a volume of 525 parts.

EXAMPLE 4

Preparation of

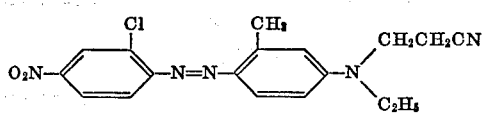

A slurry was formed from 100 parts water, 19.2 parts N-(2-cyanoethyl)-N-ethyl-m-toluidine, 17.3 parts 2-chloro-4-nitroaniline and 24.6 parts 37% hydrochloric acid. The slurry had the volume of 150 parts.

28.0 parts of 25% aqueous sodium nitrite were added to the stirred slurry during 90 minutes. No ice was added. The reaction mixture had the volume of 175 parts and a pH of 1.5.

The reaction mixture was stirred another hour and filtered. The solids were washed with water. 114 parts press cake yielded 28.5 parts dry cake containing 75% azo dye equivalent to purified azo dye from the conventional aqueous multi-step procedure using the above diazo and coupling components. The reaction mass from the multi-step procedure had a volume of 800 parts.

EXAMPLE 5

16 parts N-cyanoethyl-N-methylaniline and 14 parts of 4-nitroaniline were slurried together in 105 parts glacial acetic acid at 20–30° C. Slowly, during 1½ hours at 20–30° C., 30 parts 30% aqueous sodium nitrite were added. No added cooling was used.

The mass was stirred for 2 hours longer and then diluted by the slow addition of 50 parts deionized water. The slurry was filtered and the filter cake was washed free of acid. The filter cake was dried at 0° C. 28 parts dry cake containing 94.8% of dye, identical to purified orange azo dye made by a convention aqueous multi-step procedure, was recovered. The multi-step aqueous procedure produced a reaction mixture with a volume of 550 parts.

EXAMPLE 6

20 parts N,N-bis(cyanoethyl)aniline and 18.0 parts 2-chloro-4-nitroaniline were slurried in 100 parts water. 29.5 parts commercial concentrated hydrochloric acid were added to the slurry. To this slurry there were slowly added during 1½ hours 30 parts 30% aqueous sodium nitrite at a 20–30° C. reaction mixture temperature. No added cooling was used.

The mass was stirred an additional one hour at 20–30° C. and filtered. The solids were washed acid free with water, then dried at 70° C. 29 parts dry dye were collected containing 78.8% of azo dye of the formula

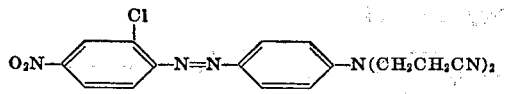

dyeing polyester fibers by disperse dyeing methods in orange shades.

EXAMPLE 7

20.7 parts 2,6-dichloro-4-nitroaniline (0.1 mole) and 29.4 parts N-cyanoethyl-N-benzoyloxyethyl aniline were slurried in 105 parts glacial acetic acid at 20–30° C. Slowly, during 1½ hours, 30 parts 30% aqueous sodium nitrite were added. No added cooling was used.

Thereafter the mass was stirred 2 hours and then filtered. The filter cake was washed with a mixture of equal parts of water and glacial acetic acid until the filtrate was clear, then with water until it was acid-free. 32.5 parts dry product were obtained, a brown azo dye of the formula

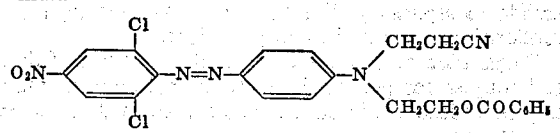

When this azo dye was produced by diazotizing the dichloronitroaniline with nitrosylsulfuric acid and coupling in aqueous acetic acid by a multi-step procedure, a volume of 1,350 parts reaction mixture was produced.

EXAMPLE 8

56 parts (0.24 mole) aminoazobenzene hydrochloride parts dimethyl formamide and 220 parts glacial acetic di(2'-benzoyloxyethyl)aniline in 850 parts glacial acetic acid. A solution of 20.7 parts (0.3 mole) sodium nitrite in 250 parts water was added to the suspension during 4 hours while controlling the mixture temperature at 16° C. Dye formed immediately on nitrite addition. When about 10% of the nitrite was added, 0.03 part of expected product was added to seed crystallization of the dye.

After an additional one hour at 16° C. the charge was filtered and washed with 60% aqueous acetic acid. The filter cake was reslurried in water, refiltered and washed with water. 180 parts dried cake were recovered, 93% of which was pure orange dye of the formula

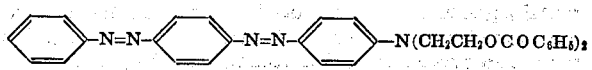

EXAMPLE 9

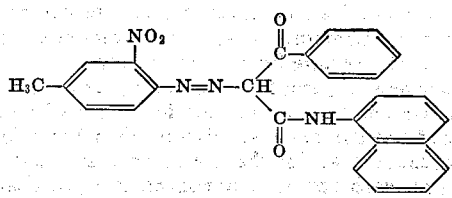

A solution was formed from 16.25 parts 2-nitro-4-methylaniline, 30.0 parts benzoylacet-α-naphthamide, 110 parts dimethyl formamide and 220 parts glacial acetic acid. 24.8 parts of 30% aqueous sodium nitrite were added to the solution during 60 minutes with stirring while the temperature was maintained at 20–25° C. by external cooling. Stirring was continued another 30 minutes.

The reaction mixture was filtered. The filter cake was washed with 25 parts cold glacial acetic acid, then with hot water until the wash water did not change the color of Congo red test paper. When liquid ceased to separate, the filter cake was collected yielding 41.6 parts dry cake containing 91% of yellow azo dye identical to purified dye produced by coupling diazotized 2-nitro-4-methyl-aniline and benzoylacet-α-naphthamide by a conventional azo coupling process.

EXAMPLE 10

In this example the azo dye prepared had the formula

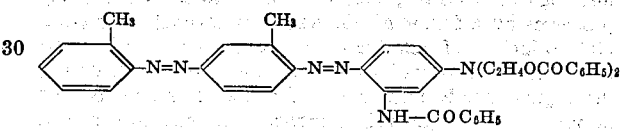

A solution was formed from 23.2 parts 4-amino-3,2'-dimethylazobenzene and 50.2 parts 3-[bis(2'-benzoyloxyethyl)-amino]benzanilide, 315 parts glacial acetic acid and 295 parts dimethylformamide.

9.9 parts sodium nitrite dissolved in 19 parts water were added to the solution at 25° C. during 15 minutes. The mixture was stirred for 16 hours longer and then filtered.

The filter cake was washed with 100 parts glacial acetic acid and then with water. 173 parts filter cake containing 36.6% solids were recovered after liquid flow from the filter cake ceased. The solids contained 96.6% of the red dye which is identical to that prepared by coupling the same diazotized amine and 3-[bis(2'-benzoyloxyethyl)amino]benzanilide by a conventional azo coupling process.

EXAMPLE 11

21.7 parts (0.1 mole) 2,6-dichloro-4-nitroaniline and 40.7 parts (0.1 mole) N,N-bis(2'-benzoyloxyethyl)-m-toluidine were slurried in 360 parts 88% formic acid. At a temperature of 20° C. maintained by a water jacket a solution of 10.3 parts (0.15 mole) sodium nitrite in 20 parts water was added during 30 minutes. Stirring was continued another 2 hours at 20–25° C. The product was filtered, washed acid-free with water and dried. There were obtained 35 parts of the brown dye

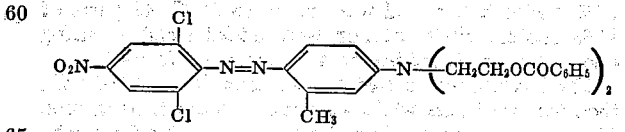

EXAMPLE 12

A suspension having a temperature of 25° C. was prepared from 390 parts glacial acetic acid, 22.9 parts 2-chloro-4-nitroaniline, 66.3 parts m-benzamidophenyldiethanolaminedibenzoate and 39 parts 31% hydrochloric acid.

A solution of 9.7 parts sodium nitrite in 250 parts water was added during one hour to the stirred suspension. The mixture temperature rose to 35° C. and was held there by a surrounding water bath during the addition. Dye formed immediately on nitrite addition, Stirring was continued for 2 hours at 35° C. and the mixture was filtered, washed with glacial acetic acid and washed with hot (70° C.) water until the filtrate was free of color and acid.

78 parts dry cake were recovered containing 94% of the red dye of the formula

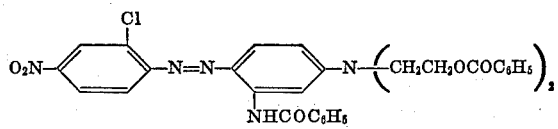

EXAMPLE 13

In this example the azo dye prepared had the formula

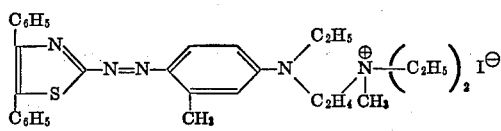

A solution was formed from 2.5 parts 2-amino-4,5-diphenylthiazole, 3.6 parts [2-(N-ethyl-m-toluidine)ethyl] diethylmethylammonium methosulfate and 47.5 parts glacial acetic acid. Sodium nitrite (2 parts of a 5 N NaNO₂ solution) was added to the solution of coupler and diazo component at 20–25° C. during 2–3 minutes. The reaction mixture was stirred 30 minutes, 125 parts water were added, and the temperature was raised to 70° C. A saturated solution of sodium iodide (2 parts) was added with agitation to precipitate the basic dye. On cooling and filtration 2.7 parts of red dye were collected; the product dyed "Orlon" polyacrylonitrile in red shades.

EXAMPLE 14

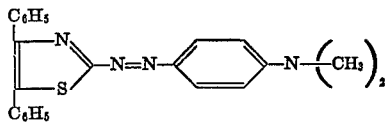

A solution was prepared from 5 parts 2-amino-4,5-diphenylthiazole, 2.4 parts dimethylaniline and 71.5 parts glacial acetic acid. Sodium nitrite (4 parts 5 N aqueous solution) was added to the reaction mixture at 20–25° C. during 2–3 minutes with stirring. The reaction mixture was stirred and cooled with ice water for 15 minutes and then poured into an excess of water; the precipitated dye was filtered off. The collected red dye amounted to 5.6 parts.

EXAMPLE 15

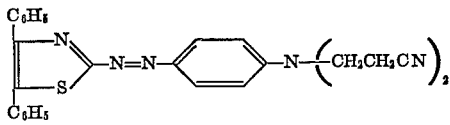

A solution was prepared by warming a mixture of 2.5 parts 2-amino-4,5-diphenylthiazole, 2.0 parts N,N-bis(2-cyanoethyl)aniline, and 38 parts glacial acetic acid. The mixture was cooled to 25° C. and 2 parts 5 N aqueous sodium nitrite were added during 2–3 minutes. The reaction mixture was stirred at ice temperatures for 15 minutes and then poured into an excess of water; the precipitated dye was filtered off. The collected orange dye amounted to 4.3 parts.

EXAMPLE 16

In this example the azo dye prepared had the formula

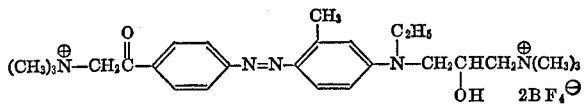

A mixture of 136 parts 8.3% aqueous solution of p-aminophenacyltrimethylammonium chloride, 15 parts 10 N hydrochloric acid and 31.1 parts 47% aqueous solution of 3-(N-ethyl-m-toluidino)-2-hydroxypropyltrimethylammonium chloride was cooled to 0–5° C. 5 N aqueous sodium nitrite, 10 parts, was added in one portion. The temperature increased to 10° C. and a deep red-brown solution was formed. The mixture was warmed to 20–25° C. and the pH was adjusted to 4 by the addition of 7.5 parts sodium acetate. Sodium fluoroborate (20.3 parts) was added to the reaction mixture. The reaction mixture was stirred for 3 hours to precipitate the dye. The reaction mixture was filtered. The presscake obtained was washed with 300 parts 10% aqueous sodium fluoroborate solution followed by 155 parts isopropanol. The dried red-brown bis cationic dye collected was 28.8 g.; λ max. 490 mμ. The yield of dye based on the diazo components was 84.4%. The product dyed acid modified nylon in red shades.

EXAMPLE 17

The azo dye prepared in this example had the formula

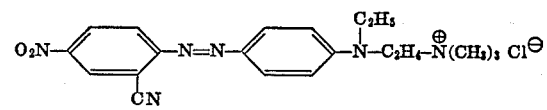

A mixture was prepared from 4.09 parts 2-cyano-4-nitroaniline, 15.5 parts 40% aqueous solution of 2-(N-ethyl - anilino)ethyltrimethylammonium chloride, 12.3 parts isopropanol and 5.5 parts concentrated hydrochloric acid. The mixture was warmed to 70° C., cooled to 10° C. overnight; 11.25 parts of water were added, then 1.75 parts of sodium nitrite in 3.5 parts of water were added during 4 hours. The reaction mixture was stirred for one hour and the precipitate was filtered off. The product was washed with 8% aqueous sodium chloride. A second crop of product was obtained from the filtrate. The combined crops totaled 3.2 parts. The solid red dye product dyed polyacrylonitrile in red shades.

EXAMPLE 18

The structure of the dye of this example was

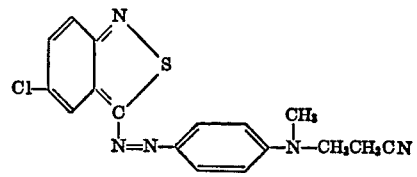

A solution was prepared from 0.92 part 5-chloro-3-aminobenzisothiazole, 0.9 part N - methyl - N-(2'-cyanoethyl)aniline and 38 parts glacial acetic acid. The mixture was cooled to 15° C. and 1 part of a 5 N aqueous solution of sodium nitrite was added. The reaction mixture was stirred one hour at 10–15° C., filtered, the bluish violet dye collected was washed with 50 parts water and dried; 1.6 parts were obtained.

EXAMPLE 19

The structure of the dye of this example was

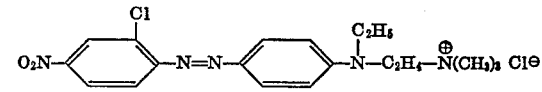

A solution was prepared from 18 parts o-chloro-p-nitroaniline, 59.4 parts 44% aqueous solution of 2-(N-ethyl-anilino)ethyltrimethylammonium chloride and 48 parts isopropanol at 40–45° C. With cooling, 21 parts concentrated hydrochloric acid and 45 parts of water were slowly added. The reaction mixture was cooled to 10° C. and 23 parts 30% aqueous sodium nitrite were added in 2 hours with stirring at 10–15° C. After stirring the mixture for an additional one hour the temperature was allowed to rise to 20–25° C.; the precipitated red dye was filtered, washed with 8% aqueous brine, dried and collected; 89.6% yield (39.8 parts of 100% dye).

EXAMPLE 20

The structure of the dye of this example was

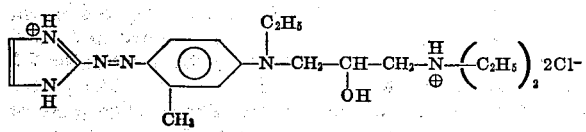

A solution was prepared from 13.4 parts bis(2-aminoimidazolium) sulfate, 30 parts water, 30 parts concentrated hydrochloric acid, 26.4 parts N-ethyl-N-(3'-diethylamino-2'-hydroxypropyl)-m-toluidine. 5 N aqueous sodium nitrite, 20 parts, was added to the amber reaction mixture over 5 minutes at 0–5° C. The temperature increased to 15–20° C. The reaction mixture was cooled to 0–5° C. and then stirred for 1.5 hours while gradually warming to 20° C. A thin layer chromatogram on silica gel with a portion of the reaction mixture after elution with a 1:1:1 ethyl acetate/acetic acid/water mixture showed a red spot equivalent to that shown by a sample of the same dye prepared independently by a conventional two-step procedure. The liquid dye product which was recovered dyed acid-modified nylon carpet fibers in orange shades.

EXAMPLE 21

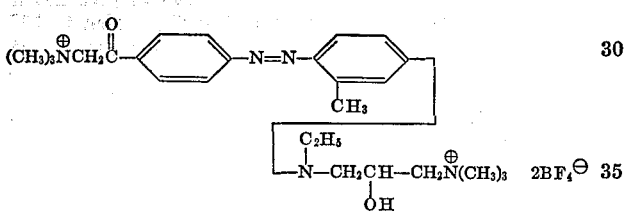

A solution was prepared from 136 parts 8.4% aqueous solution of p-aminophenacyltrimethylammonium chloride, 15 parts concentrated hydrochloric acid and 31.1 parts [3 - (N-ethyl-m-toluidino)-2-hydroxypropyl]trimethylammonium chloride. The temperature was adjusted to 5° C. and 10 parts 5 N aqueous sodium nitrite were added. After 10 minutes of stirring at 10–15° C. red dye was evident from a thin layer chromatograph (silica gel) of the reaction mixture eluted with a 1:1:1 ethyl acetate/acetic acid/water mixture. The reaction was allowed to warm to 20–25° C. and 20 parts of isopropanol were added. The pH of the reaction mixture was adjusted to 4 and the mixture was salted with sodium fluoroborate to 7.5% wt./vol. After stirring for 3 hours the crystallized dye was filtered and washed with 5% aqueous sodium fluoroborate. The red dye collected amounted to 27.7 g. (88% yield of theory); λmax. 490 mµ. It dyed acid-modified synthetic fibers in red shades.

EXAMPLE 22

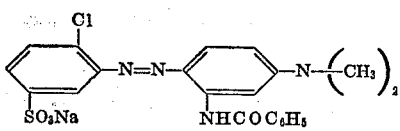

A mixture was prepared from 24 parts 4-chlorometanilic acid, 24 parts 3'-dimethylaminobenzanilide and 300 parts water at 35° C. Sodium nitrite, 7 parts, was added to the reaction mixture during one hour. A precipitate of dye formed immediately. At the end of the reaction the mixture was made basic. The oily product formed on basification crystallized on stirring further. The orange crystalline dye was filtered. The dried dye amounted to 42 parts of product (88% yield of theory); it dyed nylon fibers in bright orange shades.

EXAMPLE 23

Preparation of

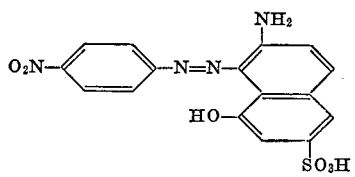

A mixture was prepared from 13.8 parts p-nitroaniline, 30 parts concentrated hydrochloric acid, 26.9 parts 7-amino-1-naphtholsulfonic acid and 286 parts glacial acetic acid. At a temperature of 21° C. 5 N aqueous sodium nitrite, 21.2 parts, was added dropwise during 10 minutes. No cooling was used during the nitrite addition and the temperature increased to 25° C. The reaction mixture was stirred 3 hours and then filtered. The cake was washed with 500 parts water and dried. The red product amounted to 36.6 parts of dye having the formula shown above (89% yield of theory, λmax. 550 mµ, absorptivity 56.5 liters gram$^{-1}$ cm.$^{-1}$); it produced red shades on nylon carpet fibers.

This example illustrates the use of a coupler bearing a relatively difficult to diazotize amine group in combination with a more easily diazotized amine group. Under the described conditions the p-nitroaniline diazotizes preferentially. Furthermore, under the acid conditions employed the diazotized p-nitroaniline couples ortho to the amino group rather than para to the hydroxy group of the naphthalene ring.

EXAMPLE 24

Aniline (9.7 grams) and 1-p-sulfophenyl-3-methyl-5-pyrazolone (28.4 grams) were stirred into 2.8 wt. percent aqueous hydrochloric acid (300 ml. H$_2$O, 20.5 ml. conc. HCl). Aqueous trisodium phosphate (25 grams in 100 grams water) was added to raise the pH from 0.6 to 3.5 so as to dissolve most of the sulfopyrazolone. The mixture was cooled to about 7° C. with agitation and 5 N aqueous sodium nitrite was added dropwise over a 20-minute period.

Color, characteristic of the expected azo compound, developed almost immediately. Testing of the reaction mixture throughout the addition of nitrite showed the nitrite reagent was being consumed about as fast as it was added and the presence of free diazo was barely detectable. During the nitrite addition the pH rose gradually, and small quantities of concentrated HCl were added periodically to keep the pH between 3.5 and 4.0. Nitrite addition was stopped after slightly more than a molar proportion of nitrite had been added and tests for nitrite and diazo were positive. The final temperature was about 10° C. The reaction mixture was diluted with water to solubilize the partially precipitated red-orange 4-benzene-azo-1-p-sulfobenzene-3-methyl - 5 - hydroxypyrazol. Barium chloride was added to precipitate the product as the barium lake; the lake was filtered off.

EXAMPLE 25

The one-step coupling of Example 24 was repeated in an organic medium. A mixture of aniline (9.7 grams), 1-p-sulfophenyl-3-methyl-5-pyrazolone (28.4 grams), glacial acetic acid (150 ml.) and N,N-dimethylformamide (15 ml.) was cooled with stirring to 20° C. The pH of the reaction mixture (determined after diluting a sample with about 25% its volume of water) was about 2, this high degree of acidity being attributed largely to the sulfo compound, a strong acid. Then 5 N aqueous sodium nitrite was added dropwise at a rate of about 35 ml./hour. The initially tan reaction mixture turned yellow on introduction of nitrite which was consumed as fast as it was added (nagtive starch-iodide test); no free diazo could be detected (negative spot coupling test). After almost all the nitrite had been added, additional acetic acid (100 ml.) was added to thin the mixture. Reaction was judged complete after about 22 ml. of aqueous nitrite had been added. The pH was about 2.5.

The reaction mixture containing the red-orange coupled product was completely soluble in water, forming a solution from which a red-yellow lake precipitated on addition of BaCl$_2$. The lake was recovered by filtration.

In each of the above examples, azo dye formation occurred immediately on adding nitrite to the acidic reaction mixture. This is observed by the almost instantaneous disappearance of the diazotizing agent (negative starch-iodide test), by development of color characteristic of the azo dye, and by the precipitation of azo dye (when the dye is insoluble in the reaction mixture). Under the conditions of the examples the pH of the reaction mixture was below 4.

The embodiments of the invention in which an exclusive property or privilege is claimed are defined as follows:

1. One-step method for preparing azo dyes by simultaneously contacting and reacting, at a temperature of 0–35° C. in a reaction mixture
    (a) a diazotizable primary aromatic amine selected from carbocyclic and heterocyclic compounds,
    (b) a coupling compound selected from the active methylene compounds β-diketones, β-keto esters, β-keto amides, β-ketonitriles, cyanoacetanilides, heterocyclic β-keto amides and β-imino amides and aromatic compounds which are not appreciably diazotizable in the reaction mixture, which have a nuclearly attached tertiary nitrogen atom and which have at least one unsubstituted nuclear position ortho or para to the tertiary nitrogen atom, and
    (c) a diazotizing agent,
said reaction mixture comprising (a), (b), (c) and an acidic liquid medium which dissolves at least a portion of each of (a) and (b) and produces a pH of 4 or less, while maintaining the concentration of the diazotizing agent and the temperature and acidity of the reaction mixture so that the rate of consumption of diazotizing agent is substantially the same as the rate of formation of azo dye.

2. The process of claim 1 wherein the diazotizing agent is formed in the reaction mixture.

3. The process of claim 2 wherein the diazotizing agent is formed by adding a nitrous acid salt to the reaction mixture.

4. The process of claim 1 wherein the reaction medium contains an acid having a primary ionization constant of at least $1.3 \times 10^{-5}$.

5. The process of claim 4 wherein the acid is acetic acid.

6. The process of claim 4 wherein the acid is formic acid.

7. The process of claim 4 wherein the acid is hydrochloric acid.

8. The process of claim 4 wherein there is also present a non-acidic liquid.

9. The process of claim 8 wherein the non-acidic liquid is water.

10. The process of claim 8 wherein the non-acidic liquid is N,N-dimethylformamide.

11. The process of claim 1 wherein the acidic liquid medium dissolves at least 10% by weight, of each of (a) and (b).

12. The process of claim 11 wherein the acidic liquid medium dissolves at least 50%, by weight, of each of (a) and (b).

References Cited
UNITED STATES PATENTS

| | | | |
|---|---|---|---|
| 2,418,416 | 4/1947 | Locke | 260—195 |
| 2,478,767 | 8/1949 | Locke | 260—144 |
| 2,478,768 | 8/1949 | Locke | 260—144 |
| 3,423,391 | 1/1969 | Kindler et al. | 260—158 |
| 2,714,104 | 7/1955 | Chenicek et al. | 260—205 |
| 2,845,326 | 7/1958 | Streck | 260—141 X |
| 2,945,849 | 7/1960 | Kruckenberg et al. | 260—185 |
| 3,079,377 | 2/1963 | Sartori | 260—205 |
| 3,109,841 | 11/1963 | Gumprecht | 260—153 |
| 3,120,508 | 2/1964 | Braun et al. | 260—161 |
| 3,148,181 | 9/1964 | Wallace et al. | 260—207 |
| 3,161,632 | 12/1964 | Straley et al. | 260—158 |
| 3,284,436 | 11/1966 | Frisch | 260—198 |
| 3,293,240 | 12/1966 | Koike et al. | 260—186 |
| 3,337,522 | 8/1967 | Wegmüller | 260—158 |
| 3,359,256 | 12/1967 | Mueller et al. | 260—205 |
| 3,377,337 | 4/1968 | Sugiyama et al. | 260—155 |
| 3,382,228 | 5/1968 | Ferrari et al. | 260—158 |
| 3,393,191 | 7/1968 | Mueller et al. | 260—205 |
| 3,514,439 | 5/1970 | Wehrli et al. | 260—147 |

FLOYD DALE HIGEL, Primary Examiner

U.S. Cl. X.R.

260—144, 152, 155, 157, 158, 162, 163, 187, 198, 193, 205, 206, 207, 207.1, 207.5